US007689229B2

United States Patent
Geary et al.

(10) Patent No.: US 7,689,229 B2
(45) Date of Patent: Mar. 30, 2010

(54) SYSTEM AND METHOD FOR DISSEMINATION OF INFORMATION IN A LIMITED-ACCESS ENVIRONMENT

(75) Inventors: John N. Geary, Wayne, PA (US); Timothy E. Dilworth, Radnor, PA (US)

(73) Assignee: myLEADERBOARD, Inc., Bryn Mawr, PA (US)

( * ) Notice: Subject to any disclaimer, the term of this patent is extended or adjusted under 35 U.S.C. 154(b) by 1587 days.

(21) Appl. No.: 10/875,906

(22) Filed: Jun. 24, 2004

(65) Prior Publication Data
US 2005/0037747 A1 Feb. 17, 2005

Related U.S. Application Data

(60) Provisional application No. 60/482,652, filed on Jun. 26, 2003.

(51) Int. Cl.
*H04Q 7/20* (2006.01)
(52) U.S. Cl. ............. 455/456.1; 455/410; 455/411
(58) Field of Classification Search ............... None
See application file for complete search history.

(56) References Cited

U.S. PATENT DOCUMENTS

| 6,571,143 | B1 | 5/2003 | Mallamo | 700/92 |
| 2001/0040109 | A1* | 11/2001 | Yaski et al. | 206/320 |
| 2002/0083000 | A1* | 6/2002 | Kawai | 705/51 |
| 2002/0087223 | A1* | 7/2002 | Moffatt et al. | 700/92 |
| 2002/0091019 | A1 | 7/2002 | Bays et al. | 473/407 |
| 2002/0094777 | A1* | 7/2002 | Cannon et al. | 455/41 |
| 2002/0147513 | A1 | 10/2002 | Burbidge | 700/91 |
| 2003/0149496 | A1 | 8/2003 | Johnson | 700/91 |
| 2004/0024650 | A1* | 2/2004 | Chen et al. | 705/26 |
| 2004/0046779 | A1* | 3/2004 | Asano et al. | 345/716 |
| 2004/0224702 | A1* | 11/2004 | Chaskar | 455/456.3 |

OTHER PUBLICATIONS

Shefter, David; 2005 U.S. Junior Amateur; Real-Time Scoring Facelift Thanks To New GHIN Technology, [online], [retrieved on Jul. 20, 2005]. Retrieved from the Internet URL<:http://www.usjunioram.org/news/ScoringDevice.html>.

(Continued)

*Primary Examiner*—Patrick N Edouard
*Assistant Examiner*—Dai A Phuong
(74) *Attorney, Agent, or Firm*—Fox Rothschild LLP (57) ABSTRACT

A limited-access environment is established to which admittance is controlled by an authority. Carrying of unapproved wireless communication devices into the environment is prohibited. Approved wireless communication devices are distributed, e.g. rented, under the authority's control for use within the environment. Rental fees may be collected for use of the device. The approved device may be specially configured to comply with rules applicable to the environment and/or to provide environment-relevant information, such as scoring and other information in context of a golf tournament event. The device may be specially configured with advertisements or other advertising indicia indicating sponsorship, etc., thereby providing the authority with advertising-related revenues. The device may include global positioning system (GPS) hardware and/or software for determining a physical location of the device relative to the earth, and software for providing information content as a function of such location information.

14 Claims, 6 Drawing Sheets

OTHER PUBLICATIONS

Exclusive PGA Tour Acce. Become a Tour Pass member and get Total Access to the PGA, [online], [retrieved on May 21, 2004]. Retrieved from the Internet, URL: http://www.real.com/partners/pgatour/?case=no_cookie&pid=pgatour_tc2&url=tourcast/in...>.

Tourcast. TOURCast Technical Requirements language, [online],[retrieved on May 21, 2004]. Retrieved from the Internet <URL: http://www.pgatour.com/tourcast/help.html>.

2003 Press Releases. PGA Tour and Realnetoworks to Debut TOURCast Plus at Nissan Open, [online], [retrieved on May 21, 2004]. Retrieved from the Internet <URL: http://www.realnetworks.com/companv/press/releases/2003/pga_rn.html>.

air2web. PGA Tour Offers Golf Fans Free Wireless Access to Real-time Scoring, Ne . . . [online], [retrieved on Jun. 15, 2004]. Retrieved from the Internet <URL: http://www.air2web.com/pr_display.jsp?id=75>.

Connect on the Go to PGA Tour MobileLink, [online], [retrieved on Jun. 16, 2004]. Retrieved from the Internet <URL: www.pgatour.com/multimedia/wireless>.

Tourcast [online], [retrieved on Jun. 16, 2004]. Retrieved from the Internet <URL: http://www.pgatour.com/tourcast/about.html>.

PGA Tour Launching Dynamic "TOURCast" Application to Provide Real-Time Tournament Access on PGATOUR.COM. Linux Power from IBM Revolutionizes Internet Coverage of PGA Tour for 2003. Issued Jan. 22, 2003, [online], [retrieved on Jun. 17, 2004]. Retrieved from the Internet <URL: http://-1.ibm.com/industries/media/doc/content/news/pressrelease/366421111.html>.

IBM system tracks golf. Technology improved for database. Issued Jun. 30, 2002, [online], [retrieved on Jun. 17, 2004]. Retrieved from the Internet <URL: http://www.poughkeepsiejournal.com/projects/ibm/bu063002s1.shtml>.

PGA Tour MobileLink is latest interactive service. Issued Mar. 11, 2002, [online], retrieved online Jun. 17, 2004. Retrieved from the Internet <URL: http://www.pgatour.com/u/ce/multi/0,1977,5119280,00.html>.

Sportvision—Internet. Nascar—Background, [online], [retrieved on Jun. 17, 2004]. Retrieved from the Internet <URL: http://www.sportvision.com/index.cfm?section=inet&cont_id=player&roster_id=36&perso...>.

Sportsvision sees its tracking system as a good bet for horseracing. Issued Dec. 2, 2002, [online], [retrieved on Jun. 17, 2004]. Retrieved from the Internet <URL: http://www.sportvision.com/index.cfm?section=pressclips&cont_id=151452 &ns=true&su...>.

* cited by examiner

SYSTEM AND METHOD FOR DISSEMINATION OF INFORMATION IN A LIMITED-ACCESS ENVIRONMENT

CROSS-REFERENCE TO RELATED APPLICATION

This application claims the benefit of U.S. Provisional Patent Application No. 60/482,652, filed Jun. 26, 2003, the entire disclosure of which is hereby incorporated herein by reference.

FIELD OF THE INVENTION

The present invention relates to dissemination of information in a limited-access environment, such as the grounds of a golf course during a professional golf tournament.

DISCUSSION OF RELATED ART

There are various examples of limited-access environments to which a person's admittance is controlled by an authority. Such limited-access environments include amusement parks, sports stadiums or other forums, concert arenas, airports, movie theaters, conference halls, etc. The authority determines whether a person will be admitted to the environment, and/or imposes rules regarding admission to, and/or behavior within, the environment. Such authorities often impose rules forbidding admission of a person carrying a wireless communication device, such as a wireless telephone, personal digital assistant or pocket PC device (collectively "PDA"), pager, etc., or rules forbidding operation of such wireless communication devices within the limited-access environment. Such devices are often prohibited because it is believed that their use within the limited-access environment will disturb others within the same environment.

Nevertheless, commercial entities and consumers alike have recognized the desirability of dissemination and receipt of information via such wireless communication devices, many of which are presently configured for Internet and World Wide Web (collectively "Web") access and/or to receive other wireless communications. Additionally, there is often a considerable amount of information available via the Web that relates to such limited-access environments or events occurring within such environments. However, such information is unavailable to persons within such environments when use of such wireless communication devices therein is forbidden.

For example, the Professional Golfers Association of America (PGA) is an authority that hosts, organizes and/or sponsors professional golf tournaments at various golf courses throughout the United States. Similar authorities conducting similar events include the United States Golf Association (USGA) and the Royal & Ancient Golf Club of St. Andrews. For example, when a professional golf tournament is in progress on golf course grounds, the PGA prohibits admission of persons onto the grounds with a wireless communication device; typically such devices are "checked" at the entrance gate to ensure that spectators and/or players are not disturbed by telephone ring tones, beeps, chirps, and other noises made by such devices. This deprives admitted persons of various wireless communications, including real-time scoring updates and other tournament play information delivered via the PGA's Web-accessible TourCast information service (accessible via URL http://www.pgatour.com). As a result, persons on the golf course grounds are typically less informed of tournament play than others monitoring the tournament from a remote location via the Web, radio, television, etc. This lack of information is compounded by the behavior of spectators at a PGA tournament in that most spectators either follow a single player from hole to hole, or remain stationary on the course and observe tournament play as various players play the nearest hole. Meanwhile, play continues concurrently at multiple holes. It is difficult for spectators to monitor the concurrent play of multiple players at multiple holes on the golf course grounds.

SUMMARY

The present invention provides a method for dissemination of information in a limited-access environment to which admittance is controlled by an authority. The method involves prohibiting carrying of unapproved wireless communication devices into the limited-access environment, and establishing a distribution point co-located with the limited-access environment. The method further involves lending, from the distribution point, an approved wireless communication device to a person for use within the limited-access environment to communicate via wireless transmission. Furthermore, the method involves recovering the approved wireless communication device from the person, e.g. within, or near, an exit of the limited-access environment. The lending may occur in exchange for a rental fee, thereby providing the authority with rental related revenues. The approved device may be specially configured to comply with rules applicable to the limited-access environment, e.g. to provide a device that does not produce audible sounds. An authority controlling access to the environment may carry out the steps described above, and may also deliver content to the device via wireless transmission. Alternatively, or additionally, information content may be delivered to the device by third parties via wireless transmission. The device may be specially configured with advertisements or other advertising indicia indicating sponsorship, etc., thereby providing the authority with advertising-related revenues.

A computer readable medium including computer readable instructions executable by a microprocessor for carrying out the method described above is also provided.

Also provided is a device for disseminating information in a limited-access environment to which admittance is controlled by an authority. The device includes a microprocessor, a memory operatively connected to the microprocessor, e.g. for communication via wireless transmission, a data transmission port operatively connected to the microprocessor, and computer readable instructions stored in the memory and executable by the microprocessor to carry out the method described above. The device may also include global positioning system (GPS) hardware and/or software for determining a physical location of the device relative to the earth, and software for providing information content as a function of such location information.

Also provided is a system including the device described above, a server storing information content for dissemination to the device, and an antenna in communication with the server and the device for transmitting such information from the server to the device via wireless transmission.

The present invention appeals to spectators/event attendees because it may enhance a spectator's knowledge concerning the event or the event's forum, provide information and responses to frequently asked questions, enhance spectator satisfaction by more intimately involving a spectator in an event, provide an interactive information appliance for entertaining a spectators during slow periods of an event, and/or provide information increasing safety, security and/or personal comfort.

The present invention appeals to authorities controlling access to limited-access environments because it may enhance enjoyment of attendees, improve and/or control crowd flow, enhance spectator involvement, create a contact point with attendees at the rental and return points that can be used for interaction with attendees, and/or create revenue opportunities. Such revenue opportunities include fees for rental of devices for use within the environment, fees from advertising sales for display of advertisements on or via the devices, and fees from corporate sponsors having hospitality tents, etc. and desiring to provide such devices for their clients, employees, etc.

DESCRIPTION OF THE DRAWINGS

The present invention will now be described by way of example with reference to the following drawings in which.

DETAILED DESCRIPTION

In one aspect, the present invention provides a method for dissemination of information in a limited-access environment that provides individuals in the environment with information delivered via wireless transmission while enabling an authority to maintain control over dissemination of the information and/or use of wireless communication devices within the environment.

According to another aspect, the present invention causes event attendees to use wireless communications devices controlled by the authority, and the authority can thereby control how such devices are configured and/or used within the environment, e.g. to ensure operation in accordance with the authority's rules. Accordingly, the present invention provides a device that can be used to ensure avoidance of ring tones, beeps, chirps and other noises that could be disruptive to others, including professional golf players during a golf tournament, while providing for certain environment-specific features that are advantageous. Furthermore, the authority's control over the wireless communication devices allows for use of the such devices as an advertising medium controlled by the authority.

Figure 1:
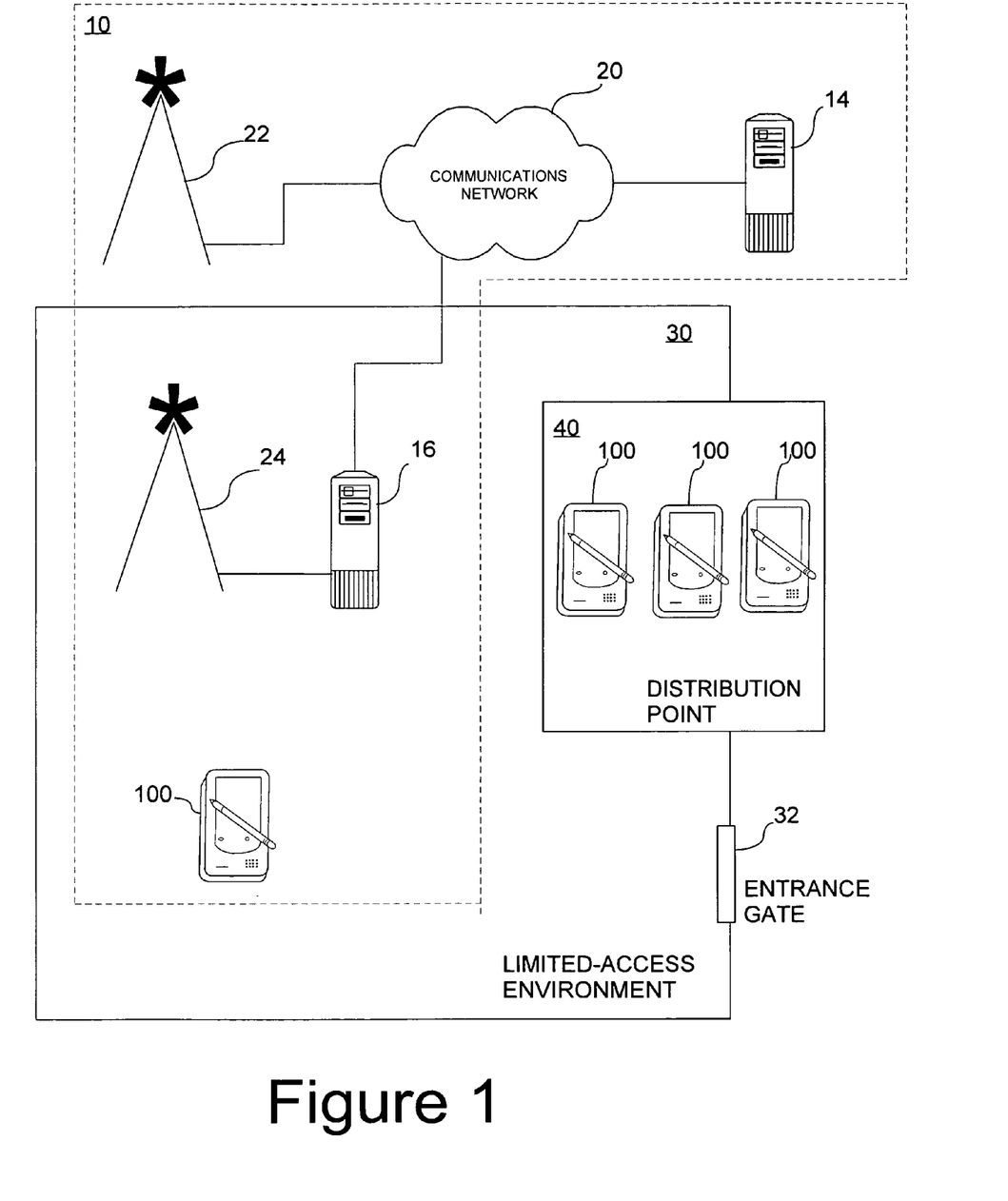
FIG. 1 is a block diagram of an exemplary system and environment in which the invention may be used.

The information dissemination method of the present invention may be understood with reference to the simplified network environment (system) 10 and limited-access environment 30 of FIG. 1. The limited-access environment 30 may include any defined area in which access is controlled and/or limited, as is generally well known in pay-for-admittance events. For example, in the context of a professional golf tournament, the limited-access environment 30 may include a fence-enclosed golf course having a single entrance/egress gate 32 controlled by an authority that hosts, organizes, coordinates, or officiates an event held within the environment 30. Ticket takers may be present at the gate and deny admittance to any person who does not have a ticket. In addition, as is known for professional golf events sponsored and/or hosted by the PGA, access is controlled in that any person having a wireless communication device is prohibited from carrying such device into the limited-access area. Typically, individuals are required to leave, i.e. "check", any such devices at the gate and reclaim such devices when exiting the limited-access environment 30.

As shown in FIG. 1, a server 14 of the network environment 10 can communicate with one or more client devices 100 via a computerized communications network 20 and broadcast antenna 22. By way of example, the communications network 20 could be a local area network (LAN), wide area network (WAN), an intranet, the Internet, etc. Any network configuration allowing data to flow between points of access may be used. In this example, the communications network 20 is the Internet, and server 14 is an HTTP Web server. Accordingly, server 14 may be located virtually anywhere, and need not be located within the limited-access environment 30. Alternatively, a server 16 located within the limited-access environment 30 may be used to serve information content for distribution to the devices 100 via a broadcast antenna 24 within the limited-access environment 30, or via an external network 20 via an external antenna 22, as shown in FIG. 1. Optionally, a portion of the information content, signals, etc. broadcast by antenna 22, 24 is available to devices outside the environment 30, either to standard wireless devices or only to specially configured devices 100. Alternatively, information content, signals, etc. broadcast to the devices 100 are receivable only by such devices 100. By way of example, this may be achieved using encryption, password protected subscriber accounts, firewall protected access, cellular communications, short range wireless communications techniques, or any of a variety of techniques well known in the art.

Accordingly, the server 14, 16 and client devices 100 can communicate with each other via a common protocol, such as the hypertext transfer protocol (HTTP) and/or various wireless communications protocols well known in the art. Any conventional Web and/or wireless communication technologies may be used. It will be understood by those skilled in the art that an actual network topology may include numerous client devices, servers, etc. The client device 100 may interface with the communications network 20 via web browser software stored and/or running on the client device 100. Currently, various alternative browser software applications are commercially available for personal computers and other web-enabled devices, such as a mobile telephone, Internet appliance, personal digital assistant (PDA), etc. The client device 100 includes a graphical user interface allowing a user to send and receive data to and from the server 14/16, as generally known in the art for network communication in a Web environment. Hardware of the device 100 includes hardware of a conventional type known for Web-enabled and/or wireless devices, and is capable of receiving and interpreting signals broadcast by wireless transmission and displaying information content represented by such signals to a user via the device 100.

Figure 2:
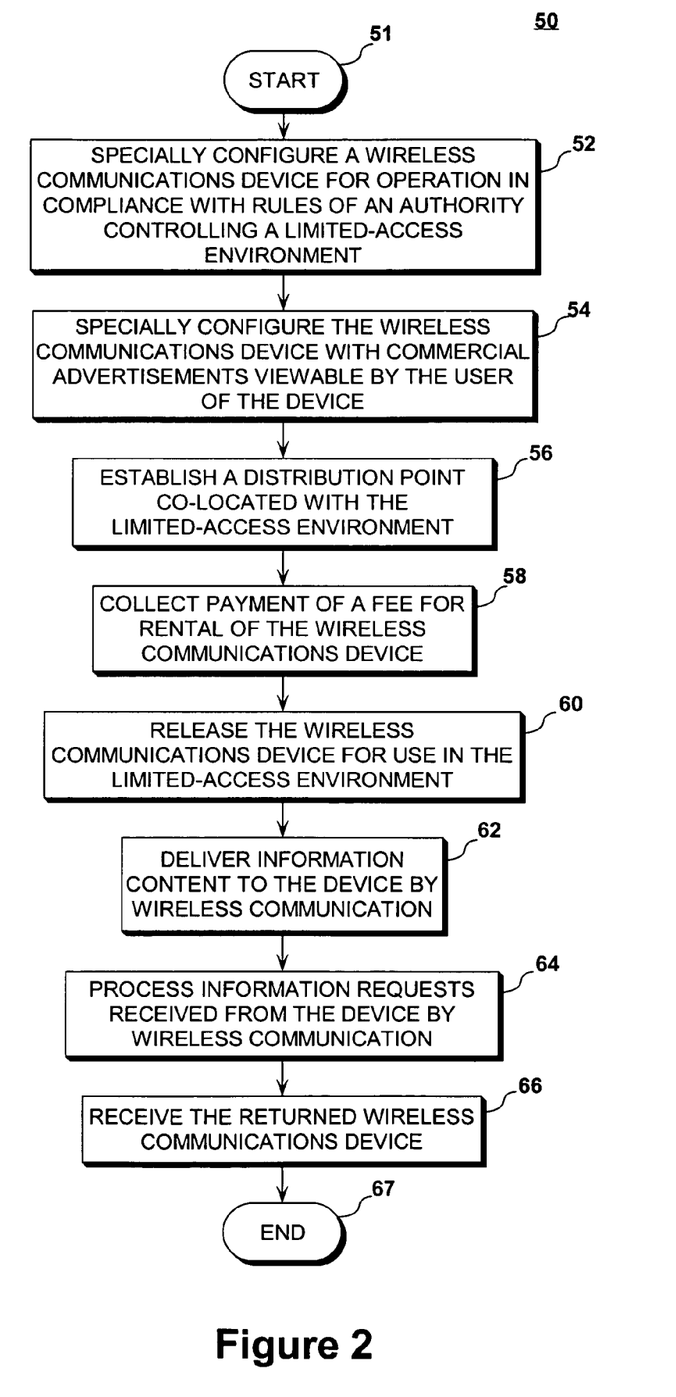
FIG. 2 is a flow diagram illustrating an overview of an exemplary method for dissemination of information in a limited-access environment in accordance with an exemplary embodiment of the present invention.

Referring now to FIG. 2, a flow diagram 50 is shown that illustrates an exemplary method in accordance with the present invention. In the example of FIG. 2, the method begins with specially configuring a wireless communication device for operation in compliance with rules of an authority controlling a limited-access environment, as shown at steps 51 and 52. This may involve installing specialized software on a general purpose wireless communications device, such as an i705 PDA manufactured and/or distributed by palmOne, Inc. of Milpitas, Calif., U.S.A., or an iPAQ pocket PC manufactured and/or distributed by the Hewlett-Packard Company of Palo Alto, Calif., U.S.A. Alternatively, this may involve manufacturing a PDA or similar wireless communications device to include certain hardware and/or software to provide the desired functionality. The functionality to be provided may be determined by the authority. For example, the PGA is an authority that hosts, sponsors, or otherwise controls PGA professional golf tournaments. Accordingly, the PGA may have certain rules that the specially configured devices may be configured to comply with. For example, the PGA may have a rule requiring that no ring tones, beeps, chirps or other sounds issue from such specially configured devices. A common vibration feature of such devices could also be avoided. Accordingly, such functionality common to many such devices may be disabled in the specially configured devices. Additionally, the PGA may wish such devices to offer GPS-driven functionality, such as the Find-A-Friend feature discussed below, and/or to offer certain "hot" buttons hard wired to provide certain functionality, such as a "Roar" button that may be depressed to initiate transfer of information to the device 100 at the user's initiative, as discussed further below.

Figure 3A:
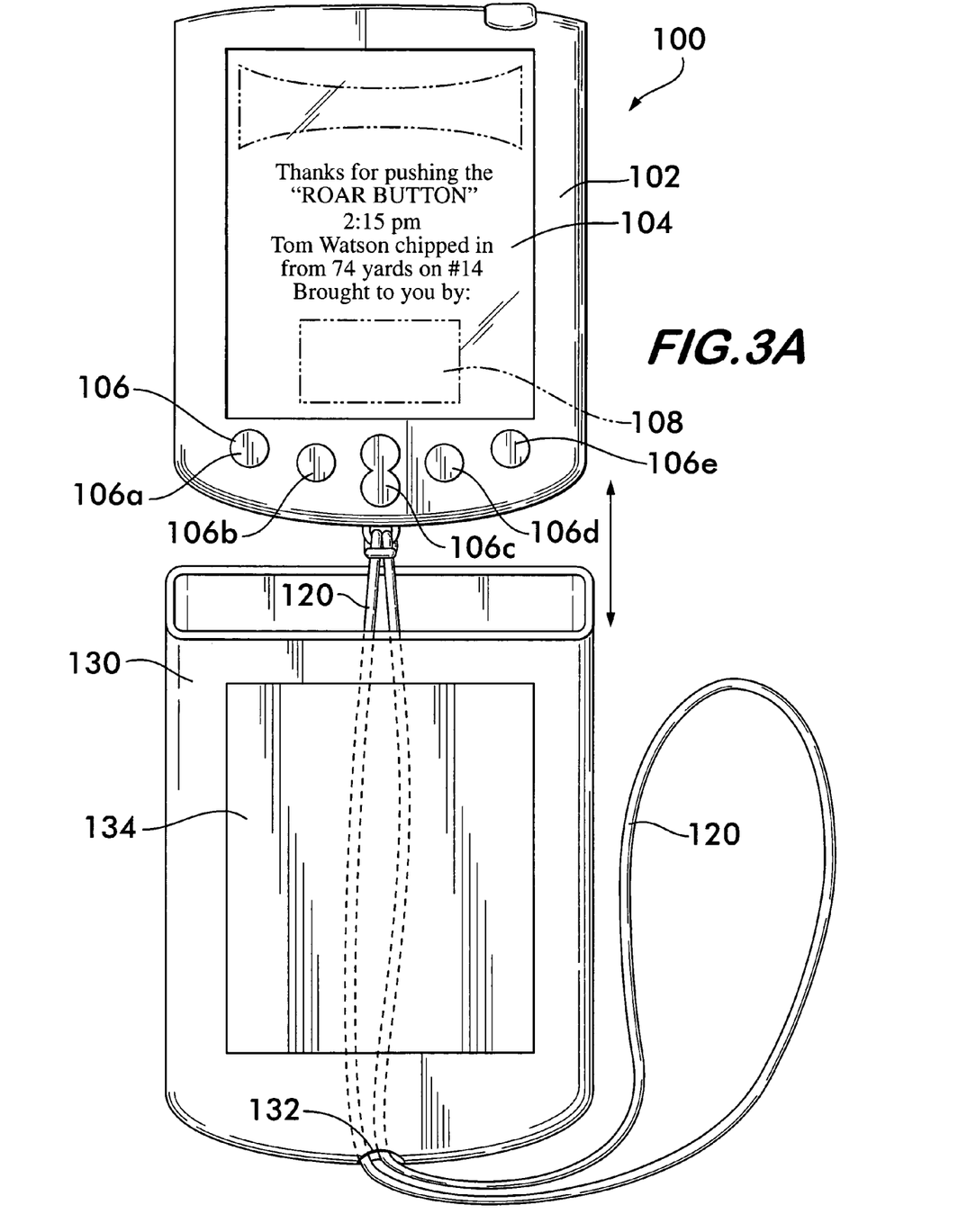
FIG. 3A is a plan view of an exemplary device in accordance with the present invention.

The wireless communications device 100 (FIGS. 1 and 3) may also be specially configured with commercial advertisements, corporate/hospitality sponsor logos, etc., viewable by the user of the device, as shown at step 54 of FIG. 2. In this manner, the device itself acts as an advertising medium. Accordingly, distribution of the device may be used to generate a revenue stream by selling advertising space on the devices to commercial entities, etc.

As shown in the exemplary device of FIG. 3A, the device 100 includes a housing 102, a display screen 104 and function/navigation buttons 106a, 106b, 106c, 106d, 106e, as known in the art for PDA and similar devices. Configuring the device 100 with commercial advertisements and the like may occur in various ways. For example, configuring the device 100 may include providing a label, printing, etc. directly on the housing 102 of the device. Alternatively, such configuring may include providing the device 100 with software for displaying an advertisement (e.g. 108) via the display screen 104.

In some embodiments (see FIG. 3A), the device 100 includes a lanyard 120 for hanging the device 100 from a spectator's neck. In such an embodiment, the lanyard itself may be painted, printed, embroidered, etc. to display advertising indicia. Additionally, the exemplary device includes a cover 130 for protecting the electronics of the device 100 from rain, spilled drinks, etc. The cover 130 may be provided as a pocket or sleeve dimensioned to fit over the housing 102. In such an embodiment, the cover 130 may include an opening 132 allowing the lanyard 120 to pass therethrough, thereby allowing sliding of the cover 130 relative to the lanyard 120 as the device 100 is worn around the neck, to cover or uncover the housing 102. In embodiments including a cover 130, the cover may also be used as an advertising medium for bearing an advertisement (e.g. 134) on its front or rear side. In other embodiments, the device 100 includes, e.g. on its rear side, a conventional belt clip of a type used for pagers, wireless telephones, etc. to facilitate attachment of the device to a wearer's belt. Optionally, the device may be attached to the belt clip by a tether of a length sufficient to allow the user to view the device's display screen while preventing the device from hitting the ground if dropped while the clip is attached to the belt.

Referring again to FIG. 2, the method continues with establishment of a limited-access environment to which admittance is controlled by the authority, e.g. a pay-for-admittance golf tournament event held on golf course grounds, as shown at step 56. Optionally, the authority may impose a rule that prohibits carrying of unapproved wireless communication devices into the limited-access environment 30, as shown at step 58. This is typical of PGA and tour golf tournaments, as discussed above.

Next, a distribution point 40 co-located with the limited-access environment 30 (see FIG. 1) is established, as shown at step 60. As used herein, "co-located" is used broadly, to include a position within the limited-access environment, outside the environment but on the premises of a facility for the limited-access environment (e.g. on the grounds of the golf course), nearby the environment, e.g. within one mile of a boundary of the limited-access environment, or in another location servicing persons entering the limited-access environment. By way of example, the distribution point may be a tent, booth, kiosk, or other designated area where devices may be borrowed and/or returned. In FIG. 1, the co-located distribution point 40 is shown in block form to straddle the boundary of the limited-access environment 30.

The method further includes collecting payment of a fee for rental of the device 100, as shown at step 62. This may include collection of a rental fee in cash, or by credit card payment. Alternatively, this may include collection of a security deposit to ensure against theft of the device, and subsequent refunding of a portion of the security deposit, the remainder being retained as a rental fee. Fees may also be collected for rental insurance in the event of lost or damages devices, etc. Any suitable method for collection of a fee may be used.

A device 100 is next released from the distribution point 40 for use in the limited-access environment 30, as shown at step 64. In other words, a device 100 is lent to an attendee that has paid the rental fee/security deposit. The user of the device is then free to wander about within the limited-access environment 30 and use the device 100 to receive information content or otherwise communicate by wireless transmission.

Figure 3B:
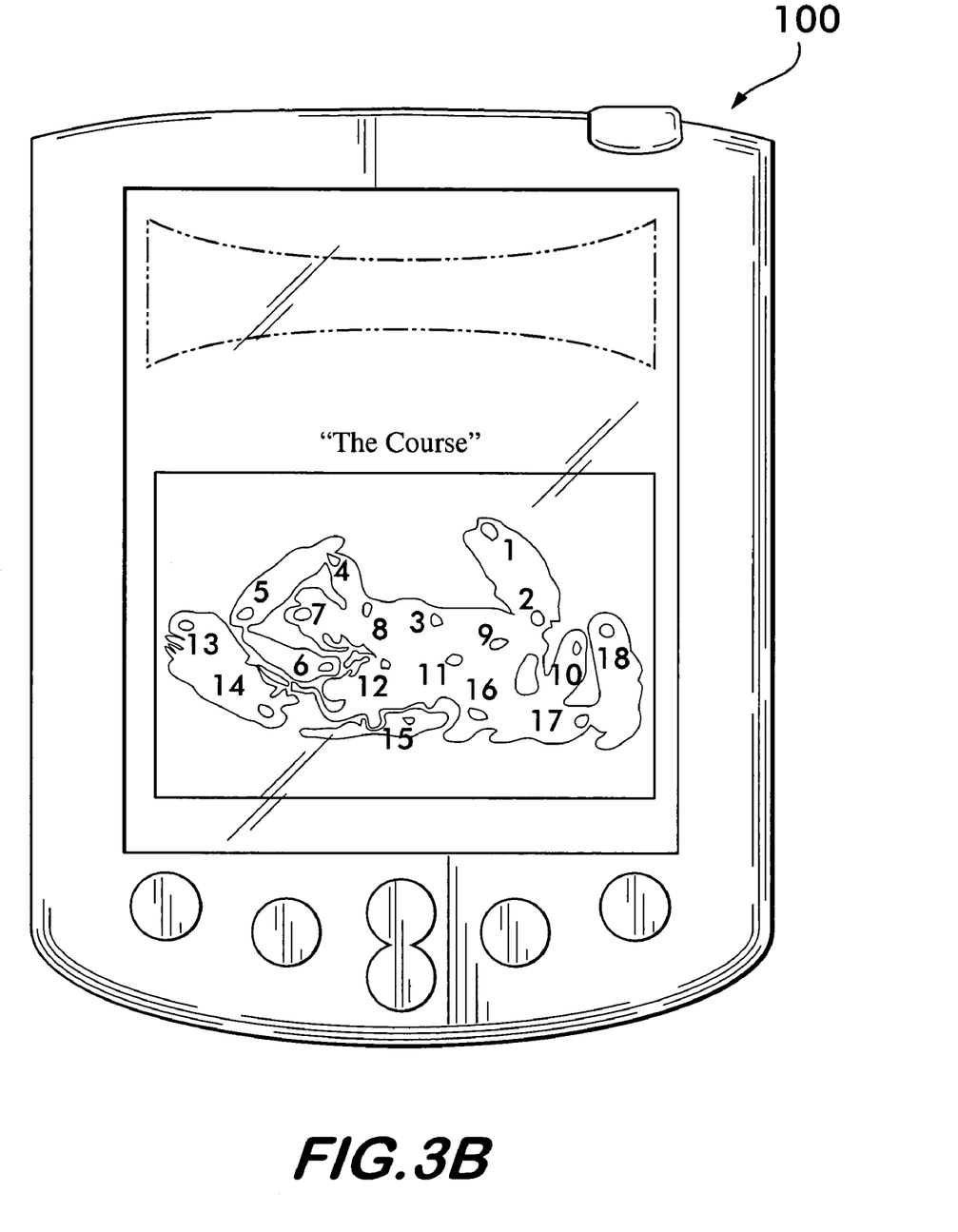
FIGS. 3B and 3C are plan views of the device of FIG. 3A, with portions removed for illustrative simplicity.
Figure 3C:
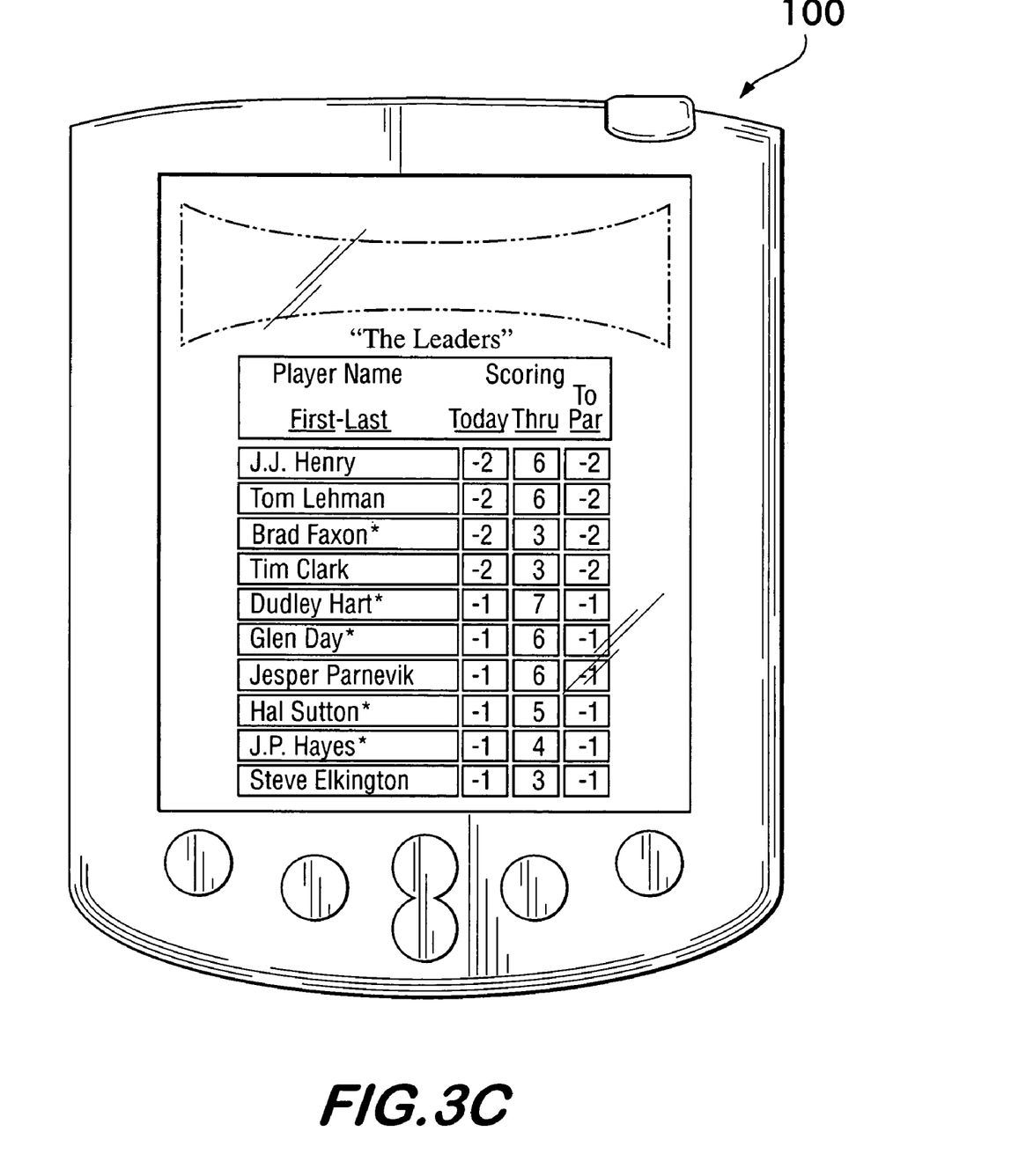

The method may include delivering information content to the device 100 by wireless communication, as shown at step 66. Preferably, the information content delivered to the device relates specifically to the limited-access environment and/or an event being conducted in the limited-access environment at the time of delivery of the information content. For example, this step may involve monitoring a golf tournament event occurring within the limited-access environment and recording scores of a plurality of individual players playing concurrently at a plurality of holes within the limited-access environment, preparing and repeatedly updating the information content reflecting current recorded scores for each of the plurality of players, and then transmission of data from servers 14 and/or 16 via antennas 22 and/or 24 of FIG. 1, e.g. by broadcasting. Accordingly, this allows for dissemination of information that might not otherwise be relevant to a viewer/user that receives data via a Web interface that is not specifically related to a limited-access environment. For example, the information content delivered to the device while the device is operated within the limited-access environment may include a map indicating locations of restrooms. Such information is not particularly relevant for delivery by a Web interface to members of the general public that may never attend the event. Additionally, it allows for time-sensitive delivery of information relating to events occurring within the limited-access environment. For example, the information content may include an announcement that the next 50 visitors to the golf course's clubhouse will receive a free gift, or that there is presently no line at a certain concession stand, or that a certain event is about to happen, e.g. Tiger Woods is approaching the tee of the fourth hole during a golf tournament. These types of announcements allow the individual to react to the announcement in real time, and can be used to control foot traffic, divert individuals to smooth loads on restrooms, concession stands, etc. By way of further example, information content delivered via the device 100 may include a weather report including current temperature, sun factor, inclement weather warnings, wind speed, etc., or other messages or warnings, such as those coordinated with an existing weather reporting system, such as the THOR GUARD Lighting Prediction System commonly used on golf courses. By way of further example, in the context of a limited-access environment that is a golf course hosting a golf tournament, the information content may include a traffic/parking/concession/restroom map, a golf course layout (see FIG. 3B), golf course history, hole description, past event trivia, golf trivia, pertinent rules of golf, stimpmeter results providing a measurement of greens speed, player biographies, transportation information identifying bus routes, schedules or other transportation means from the environment to a remove parking area, etc. Optionally, some of this information may be stored in a memory of the device, e.g. by loading such information onto the device 100 at the distribution point 40, without the need to broadcast such information to the device. The information content may further include broadcasted data updated in real-time, such as a leaderboard (see FIG. 3C) showing player scores, player ranking, player progress reports, and player location reports to indicate who is playing a certain hole, who is approaching a certain hole, etc.

Additionally, the method may include processing of information requests (e.g. data) received from the device 100 by wireless communication, as shown at step 68. Accordingly, the device 100 may be interactive, and provide a unique experience to each device user as a function of the user's information requests. Such information may be provided in addition to any information content broadcasted to multiple devices absent a user's information request. For example, a certain feature of the present device is a Roar Announcement function. In an embodiment of the device including such functionality, a Roar Announcement command may be executed by a user by pressing a designated button of the device, e.g. 106(e), and/or selecting an appropriate icon or menu option displayed via the device's display screen 104. When a user hears the roar of the crowd, e.g. coming from an adjacent hole of a golf course, and the user cannot see what has just transpired, the user may execute the Roar Announcement command. Execution of such a command transmits a signal from the device 100 via wireless transmission that is a request for information content explaining what has just happened within the limited-access environment that incited the crowd to roar. This causes the server 14, 16 to transmit via wireless transmission information content describing what has just transpired, e.g. a certain player making a certain shot. Such information may be compiled and readied for distribution in a conventional manner, e.g. using an on-site content editor/programmer. See exemplary information content displayed via screen 104 of device 100 in FIG. 3. Alternatively, information content explaining the roar of a crowd may be automatically "pushed" to a device 100 from the server 14, 16 without the need for execution of a command at the device 100 to initiate a request. By way of example, in the context of a golf tournament, volunteers arranged about the golf course may track various aspects of a golf drive, chip, putt, etc. as to distance, location, stance, lie, etc., and enter such information and/or descriptive text into a handheld device that causes data to be transmitted to a centralized computing facility for inclusion in a central scoring administration system. This information may be used to create the information content transmitted to the device 100 in response to execution of the Roar Announcement command. The Tour uses a ShotLink system to permit volunteers to gather and transmit such information, and compiles a database of information referred to as Tournament Tracker. The dissemination of information via TOURCast is an application utilizing such database. Accordingly, the device 100 may be used to receive and/or send information to provide a range of functionality, as discussed further below.

Additional functionality may be provided when the device is configured with suitable hardware and/or software for providing GPS capability. Such GPS capability is well known in the art for providing a physical location of a device. When the device 100 is configured so that it can be determined where the device is presently located, e.g. at a certain longitudinal and latitudinal position with respect to the earth, additional information can be provided as a function of such location information. For example, a best evacuation route may be provided in the event of an emergency, such as a thunderstorm on a golf course. Alternatively, information may be provided indicating a nearest concession stand or restroom. Additionally, a medical alert may be issued to indicate to a central monitoring station that medical assistance is needed at a geographic location of the device 100 when a medical alert command is activated on the device. For example, this command may be initiated by pressing a designated button of the device 100. Such features are not relevant when such information devices are viewable globally, outside of the limited-access environment.

Additional features are provided via the device that are not relevant when information content is viewable globally, outside of the limited-access environment. For example, the device may provide Find-A-Friend functionality when more than one device is GPS capable. This facilitates rejoinder of spectators that become separated, which is common for spectators of golf tournaments because of the concurrent occurrence of play at multiple locations. For example, pressing of a designated button or otherwise initiating this functionality may cause information to be transmitted to the device 100 that indicates a location of another device 100. For example, each individual device may be assigned a code, and that code may be input by a user to the device 100, which then communicates with a central system to find another device having the designated code. For example, such information may be communicated by showing the position of the other individual's device on a map of the limited-access environment, e.g. with a symbol. Alternatively, two or more devices may be associated with one another by an attendant of the distribution point, such that initiating the Find-A-Friend feature on one device will automatically return the position of the associated device. Additionally, the device 100 may allow for messaging between devices of the system, e.g. so that one person within the environment 30 may send a message to another person within the environment 30 via the devices 100, e.g. to say "meet me at the $18^{th}$ green in ten minutes." Optionally, a menu driven graphical user interface may be provided that will permit a user to select from a pre-established list of messages or portions of messages. For devices including GPS capability, the device may provide directions for a best route to reach the designated meeting place (e.g. $18^{th}$ green) from the current location of the device when this feature is used. This may be accomplished in a variety of ways, as will be appreciated by those skilled in the art. Software for performing this functionality is preferably stored on the device.

Various other features may be provided via the device 100. For example, information may be pushed to users' devices to indicate that a certain player is presently playing exceptionally well and making a "charge", such that users may wish to move from their respective present locations to the hole at which that certain player is presently playing. By way of example, information relating to a charge, a roar of the crowd, or weather report updates may be caused to scroll across the display screen of the device. Further, an e-commerce type interface may be provided via the device such that users can purchase online via the device various golf club or event related merchandise, food, etc., thereby avoiding lines, etc. at the local clubhouse, tent, kiosk, etc. Arrangements may be made via the device to pick up the purchased merchandise at a designated location within the limited-access environment, or to have such purchased merchandise shipped to a designated address, etc. Users may find such shopping entertaining during down time during the event. Further, the devices can be used as a marketing tool to push to users/devices advertisements for merchandise available for purchase, e.g. on a periodic basis. Further still, the device may be used to deliver content such that the user may participate in a trivia contest or other game for prizes, discounts, coupons, etc., such as those that may be redeemable at the event. Multiple users of the device may compete against one another in such games. Further device functionality may include allowing individual users to enroll/obtain membership in the PGA's, USGA's or other authority's association. Further, information provided by such users may be obtained by the authority and/or an operator of the system/devices to compile a database of user information, e.g. such as information that may be used for direct marketing purposes. For example, such information may be provided by the user via the device, in completing a questionnaire necessary to obtain/rent the device, used in making a purchase via the device, etc. Further still, corporate or other hospitality sponsors may be provided with information that allows for tracking of the devices/users of the devices within the event. For example, if company A provides 10 devices to its invitees, company A may be provided with GPS or other information about how those 10 devices are used, where they are presently located, etc.

Finally, the method ends with recovering the device 100 from the borrower, e.g. at the distribution point 40, as shown at steps 70 and 71. Optionally, a portion of any security deposit may be refunded and/or payment for the device may be perfected at this time. For example, the user may return the device 100 to the distribution point 40 as the user exits the limited-access environment 30 via the gate 32.

It should be noted that corporate sponsors may wish to rent or otherwise arrange to have a number of such devices available for use by their guests, e.g. without a rental charge to the guest. For example, rental of such devices may be included as part of a bundle of services provided in connection with the corporate sponsor's purchase/rental of a hospitality tent at the event. Alternatively, the corporate sponsor may pay separate rental fees for use of such devices. When a corporate sponsor intends to offer such devices to its guests, additional provisions may be made to identify such devices separately from other devices usable within the limited-access environment, such that the sponsor or another can send information content to those devices provided to its guests, without providing such information content to other devices operating within the same system. For example, such information content may be used to recall such guests to a corporate hospitality tent for a certain event or function to be held in the tent.

Accordingly, a person entering a limited-access environment may rent a specially configured device at the limited-access environment, use the device within the limited-access environment, and then return the device. The rental of such devices provides additional revenues to the authority controlling access to the environment. Use of the device by persons entering the environment can be enhanced by imposing a rule prohibiting persons entering the environment from carrying their own, unapproved, wireless communication devices into the environment. Additionally, the authority maintains control over use of the devices by having them specially configured to meet the authority's needs/desires/rules, e.g. to prevent noise from such devices. Further, the device itself may be used as an advertising medium by configuring the devices to display advertisements/advertising indicia. For example, such advertising space may be sold/leased to commercial entities, which further enhances the authority's revenues.

Figure 4:
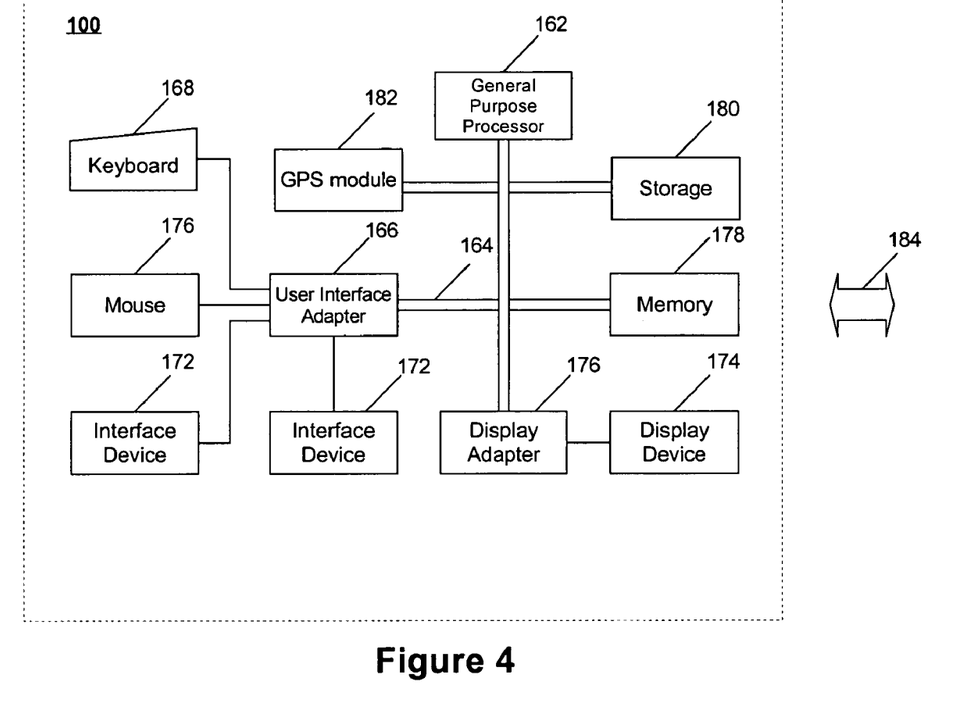
FIG. 4 is a block diagram of the exemplary device of FIGS. 3A-3C.

FIG. 4 is a block diagram of a wireless communications device 100 (see FIGS. 1 and 3) in accordance with the present invention. The device 100 may include hardware and software similar to that employed for conventional wireless communication devices, such as personal digital assistant (PDA) devices. As is well known in the art, the device of FIG. 4 includes a general purpose microprocessor (CPU) 162 and a bus 164 employed to connect and enable communication between the microprocessor 162 and the components of the device 100 in accordance with known techniques. The device 100 typically includes a user interface adapter 166, which connects the microprocessor 162 via the bus 164 to one or more interface devices, such as a keyboard 168, mouse 170, and/or other interface devices 172, which can be any user interface device, such as a touch sensitive screen, digitized entry pad, etc. The bus 164 also connects a display device 174, such as an LCD screen or monitor, to the microprocessor 162 via a display adapter 176. The bus 164 also connects the microprocessor 162 to memory 178 and long-term storage 180 (collectively, "memory") which can include a hard drive, diskette drive, tape drive, etc. The bus 164 further connects the microprocessor 162 to a global positioning system (GPS) module 182, which may include hardware and software of a type generally known in the art for determining a geographic position of the device 100.

The device 100 may communicate with other computers or networks of computers, for example via a communications channel, wireless network card/antenna or wireless modem/antenna 182. The device 100 may be associated with such other computers in a local area network (LAN), a wide area network (WAN), intranet, Internet, etc. such that it may communicate by wireless communication. All of these configurations, as well as the appropriate communications hardware and software, are known in the art.

Software programming code for carrying out the inventive method is typically stored in the memory 178, 180 of the device 100. Accordingly, the device 100 stores in its memory microprocessor executable instructions. These instructions may include programs for carrying out the method steps described above. Additionally, computer readable media storing computer readable code for implementing the method steps is provided (see discussion of method steps above).

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A method for dissemination of information, the method comprising: establishing a limited-access environment comprising a golf course at which a professional golf event is occurring and to which admittance is controlled by an authority; controlling admittance to the golf course to prevent an attendee from carrying an unapproved wireless communication device into the golf course during the professional golf event; distributing an approved wireless communication device to the attendee for use within the golf course during the professional golf event, the approved wireless communication device being specially configured according to a preference of the authority; creating information content at a location within the golf course; and broadcasting the information content for delivery to the approved wireless communication device by wireless transmission while the approved wireless communication device is within the golf course, wherein the information content relates to the professional golf event occurring within the golf course and includes information concerning the performance of the players competing in the professional golf event; and including also displaying a selected commercial advertisement on the approved wireless communication device which is specially configured to display said advertisement via a display screen of the wireless communication device, the authority or another enterprise having collected payment for the display of said advertisement via said device.

2. The method of claim 1, further comprising: collecting payment of a fee for rental of the approved wireless communication device; and recovering the approved wireless communication device from the attendee.

3. The method of claim 1, wherein the approved wireless communication device is specially configured to operate in compliance with a rule of the authority.

4. The method of claim 3, wherein the approved wireless communication device is specially configured to operate without making audible signals in compliance with a rule of the authority that prohibits such audible signals.

5. The method of claim 1, wherein a housing of the approved wireless device is specially configured to also display a selected commercial advertisement.

6. The method of claim 1, wherein the approved wireless communication device is specially configured to include a lanyard enabling the approved wireless communication device to be worn about the neck of the attendee.

7. The method of claim 6, wherein the approved wireless communication device is specially configured to include a cover dimensioned to fit over a housing of the device, the cover including an opening allowing the lanyard to pass therethrough, the cover being slidable relative to the lanyard to selectively cover or uncover the housing.

8. The method of claim 1, further comprising: establishing a distribution point co-located with the golf course, the approved wireless communication devices being distributed from the distribution point.

9. The method of claim 1, wherein delivering the information content comprises pushing data from a server to the approved communications device.

10. The method of claim 1, wherein delivering the information content comprises displaying a weather report via the approved communication device.

11. The method of claim 1, wherein delivering the information content comprises displaying a transportation or traffic report via the approved communication device.

12. The method of claim 1, wherein delivering the information content comprises transmitting data response to operation of a button of the approved communications devices by the attendee.

13. The method of claim 1, further comprising: receiving an information request from the attendee via the approved wireless communication device; and processing the information request.

14. The method of claim 13, wherein processing the information request comprises processing a purchase transaction for an article of merchandise, the method further comprising: presenting the article of merchandise for pick-up by the attendee within the limited-access environment.

* * * * *